T. J. BREWSTER.
PROCESS OF NITRATING BENZOL.
APPLICATION FILED NOV. 20, 1917.
1,380,185.
Patented May 31, 1921.
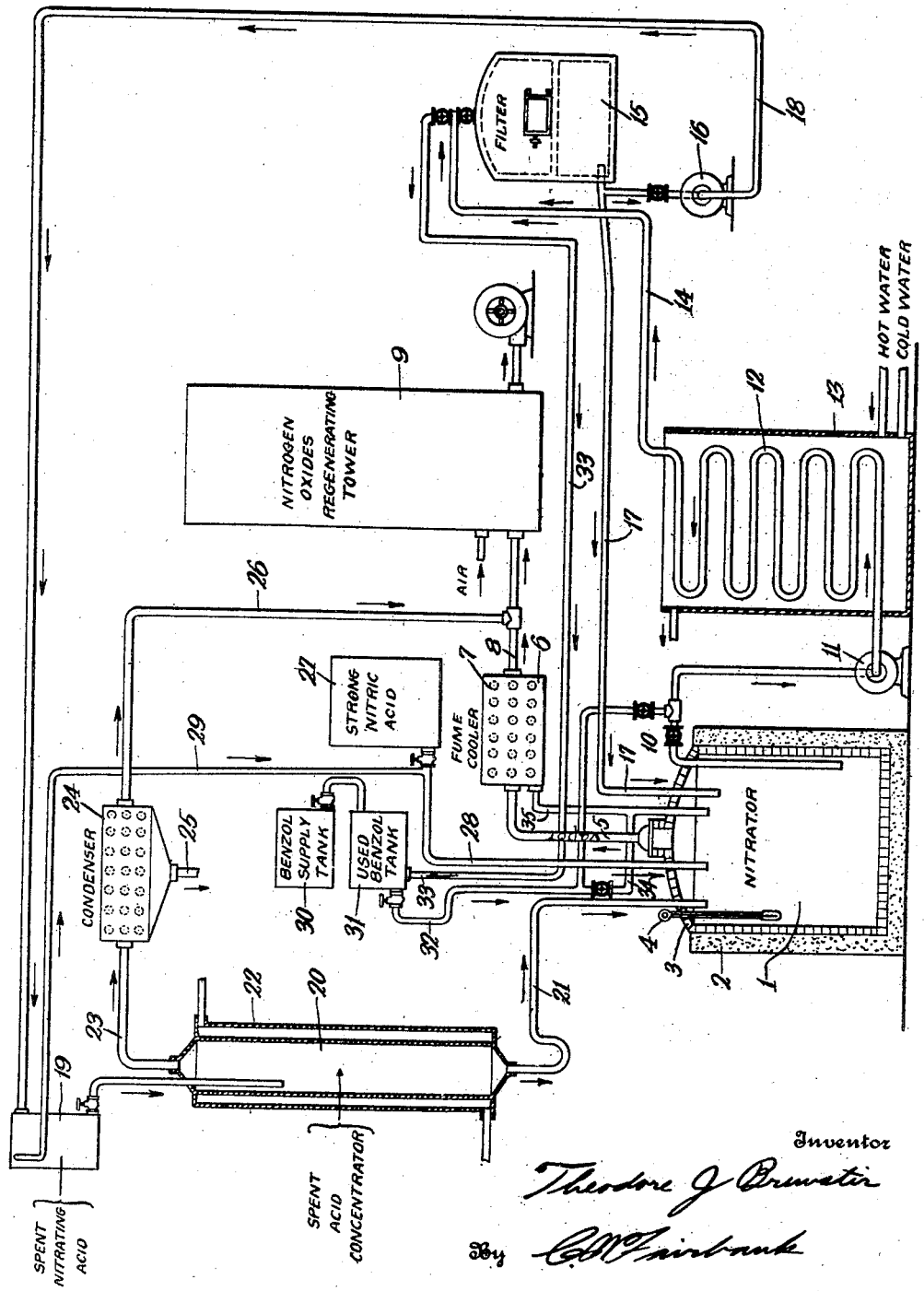

UNITED STATES PATENT OFFICE.

THEODORE J. BREWSTER, OF PERTH AMBOY, NEW JERSEY.

PROCESS OF NITRATING BENZOL.

1,380,185. Specification of Letters Patent. Patented May 31, 1921.

Application filed November 20, 1917. Serial No. 202,930.

*To all whom it may concern:*

Be it known that I, THEODORE J. BREWSTER, a citizen of the United States, and resident of Perth Amboy, in the county of Middlesex and State of New Jersey, have invented certain new and useful Improvements in Processes or Nitrating Benzol, of which the following is a specification.

This invention relates to processes of nitrating benzol; and it comprises a method of simultaneously oxidizing and nitrating benzol to produce dinitrophenol adapted for direct use or for subsequent conversion into trinitrophenol or picric acid or other products.

In carrying out my process, benzol is treated with nitric acid of a moderate strength, best around 50 per cent. content of real acid ($HNO_3$) in the presence of a catalyst, the dinitrophenol produced by the action of the acid on the benzol being removed and collected substantially as fast as it forms, this being advantageously done by keeping the acid in cyclic flow through the reaction chamber, and a filter or other separator.

This invention may be carried out in a new organization of apparatus elements in which this or possibly other processes might be carried out. In this apparatus, various changes may be made in the details of all of the elements and some elements may, under some circumstances, be entirely omitted. A preferred organization includes a reaction chamber adapted to withstand the action of nitric acid, means for controlling the temperature, filtering or other separation means, and conduits, whereby acid from the reaction chamber may be kept in a continuous or intermittent cyclic flow through said chamber, cooler, and filtering means. As anciliary thereto, but still of importance, I provide means for supplying benzol and acid to said reaction chamber, means for removing and cooling fumes from said reaction chamber, means for returning condensed liquids formed in the cooling of the fumes back to the chamber, and means for diverting a portion of the acid in said cyclic flow and passing the same through concentrating or strengthening means back to the reaction chamber, all as more fully hereinafter set forth and as claimed.

Picric acid or trinitrophenol $C_6H_2OH(NO_2)_3$, and dinitrophenol $C_6H_3OH(NO_2)_2$ differ from benzol, or as it is sometimes known, "benzene" $C_6H_6$, by the presence of hydroxyl (OH) and nitric acid ($NO_2$) residues replacing part of the hydrogen (H) of the benzol. In order to produce either from benzol, the benzol must be oxidized (to give the OH group) and nitrated. In making picric acid, it has long been the custom to start with phenol, $C_6H_5OH$, made from benzol by various methods not here material. The amount of phenol which can be recovered from coal tar is too small to supply the market demand and therefore phenol is in large part made synthetically. The synthetic methods of production are, more or less, expensive. The phenol is customarily nitrated with a mixture of sulfuric and nitric acid according to a well known method. Sometimes, in lieu of using phenol as a raw material, benzol is chlorinated to give the monochlor derivative $C_6H_5Cl$ and this is then nitrated. This also is expensive.

In the present invention, I have provided a simple and direct method of producing dinitrophenol and trinitrophenol from benzol wherein oxidation and nitration are simultaneously accomplished, this being done with the aid of a catalyst, preferably mercury. In the oxidation, the oxygen is provided at the expense of nitric acid which is thereby reduced to the lower oxids of nitrogen, but since these lower oxids can be, and are, regenerated to nitric acid by the action of air in the present process, virtually the oxidation necessary in the process is accomplished with the aid of the oxygen of air; which means an important economy in the present process as compared with the processes of the prior art.

When benzol is heated with nitric acid in the presence of mercury as a catalyst, it nitrates and oxidizes, giving a mixture of nitrated and oxidized products with evolution of nitrous vapors—these nitrous vapors being produced in the oxidation of the benzol. This method has been proposed for the direct production of picric acid since picric acid, in the usual methods of operating, forms an important portion of the product. The yield of picric acid, however, is small and the mixture of products obtained requires careful treatment to isolate the picric acid from the other nitration materials formed. In this method, as in all methods where mercury is employed, it has been found difficult in practice to keep the mercury from "going into organic combination;" that is, to prevent the formation of organic compounds containing mercury which contaminate the product.

I have found that in this reaction, I can impose conditions whereby the reaction is controlled and the primary action does not go so far as picric acid, but forms substantially only dinitrophenol. As dinitrophenol is of value in various arts and also is very readily converted into trinitrophenol or picric acid by further nitration, this controlled operation with the formation only of dinitrophenol without a substantial production of by-products is very advantageous. To this end, I nitrate with an acid which is not too strong, and at a temperature which is not too high. Ordinarily I employ acid containing between 45 and 55 per cent. of actual nitric acid and work as nearly as possible between 50° and 60° C. Stronger and weaker acids and higher or lower temperatures, though they may be employed with some of the advantages of my invention, do not give as advantageous results as temperatures and strengths within the ranges mentioned. A 50 per cent. acid at about 50° C. gives the best results. I use a rather large amount of mercury as a catalyst, say about 0.3-0.5 pounds per gallon of 50 per cent. acid. This mercury may be added to the acid either as the metal or as the nitrate. Use of the metal is convenient since it is at once taken up by the acid to form the nitrate. This mercury stays in the apparatus and is not lost, the same quantity serving to produce indefinite amounts of dinitrophenol. A small amount of silver nitrate appears to speed the reaction. Other catalytic agents may be found satisfactory. In the conjoint action of dissolved mercury and nitric acid on benzol, the primary product is dinitrophenol, as stated, but as this dinitrophenol accumulates, it tends to nitrate further with the production of picric acid. Other actions also take place which result in a loss of material. Therefore, as an important part of the present invention, I remove the dinitrophenol as it is produced. This is easily accomplished by removing the nitrating mixture, cooling it and returning the cooled acid back to the reaction chamber. The cooling serves a double function as the return of the cooled liquid keeps the temperature from rising too high in the reaction chamber and the cooling of the withdrawn portion facilitates the separation therefrom of the dinitrophenol. Dinitrophenol is somewhat soluble in the warm nitric acid and crystallizes out on cooling. By this cooling operation, therefore, I can keep the concentration of dinitrophenol in the reaction chamber at a low point and can remove the dinitrophenol substantially as fast as it is formed. This much conduces to the cleanness of the reaction. The cyclic flow also serves the important function of keeping the mixture in the reaction chamber agitated and homogeneous. In practice, I simply draw off portions of the liquid from the nitrating chamber continuously or intermittently, pass them through a cooler, and then pass through a filter, or other separator, to take out or deposit the crystallized dinitrophenol separated by the cooling. The cooled liquid may then be returned to the reaction chamber to serve anew.

As the reaction consumes nitric acid and also dilutes it, I ordinarily divert a portion of the acid in cyclic flow through the apparatus just described and send it to a concentrating apparatus which removes water and sends back a more concentrated liquor containing nitric acid and mercury to the reaction chamber. Fresh nitric acid is added from time to time. In the process as just described, it will be noted that I have in effect two cyclic flows of nitric acid containing mercury, one being through the cooling apparatus and the filter and thence back to the reaction chamber while the other flow is from the filter through a concentrating apparatus back to the reaction chamber. The same apparatus that serves for a cooler may be used as a heater in the initial raising of the temperature to the desired point for the best reaction. After the reaction begins, it develops heat. The interchanger delivers heat at starting or receives heat during normal operation, depending upon the temperature of the liquid used.

In the preferred use of my process, the portion of the mixture which is withdrawn is cooled after withdrawal and the temperature in the reaction chamber is kept down by the return of this cooled portion. A less desirable but permissible way would be to provide the reaction chamber with a jacket or coil through which a heating or cooling fluid might be circulated to control the temperature of the main mass. A further permissible alternative is to use the outside cooler to lower the temperature of the withdrawn portion to a very low point (below 50° C.) with correspondingly larger separation of the dinitrophenol and to then partially reheat the mixture to about 50° C. after leaving the filter to prevent too great a lowering of the temperature in the reaction chamber by the low temperature of the portion returned. A separate heater might serve this purpose or a counter current apparatus might be used to transfer to the returning portion some of the heat of the liquid leaving the chamber.

In the accompanying illustration I have shown, more or less diagrammatically, a complete apparatus useful in the performance of the described process and within the purview of this invention.

As shown, this apparatus comprises a nitrator 1 which may be a large concrete tank lined with acid-proof brick set in acid-proof cement and provided with heating or cooling jacket 2. As stated, heating is usually necessary in beginning the operation but cooling may afterward become desirable. I aim to maintain the temperature within the nitrator at about 50° C. The nitrator may be provided with a crown or cover 3 of acid-proof brick. The thermometer 4 serves to indicate the temperatures. From the top of the nitrator vapor conduit 5 leads to a fume cooler and condenser 6 which is usually made of high silicon iron and contains a number of diagrammatically shown cooling cross tubes 7 also made of high silicon iron through which water may be circulated by appropriate connections (not shown). From this cooler the condensate may drain to or be returned to the nitrator and the uncondensed fumes pass through conduit 8 to diagrammatically shown regenerating tower 9 wherein such fumes are reoxidized to nitric acid in a well understood way with the aid of air.

Through the cover also passes a conduit 10 leading from a low point in the nitrator and passing thence to a pump 11. By this pump the nitrating mixture in the nitrator is sent through cooler 12 which may be made of several sections of high silicon iron flanged pipe, connected together with return bends properly supported. The coils may be sprayed with cooling water or they may be immersed in a water tank 13. The return bends may be outside the tank and removable to facilitate cleaning. In beginning the operation, I ordinarily charge this water tank with hot water to heat the circulating nitrating mixture. Afterward, I use cold water. From the acid cooler, a conduit 14 leads to a separating and collecting device 15 wherein separated dinitrophenol is collected for sale or subsequent treatment. Such device is preferably in the form of a filter but mere settling tanks might suffice. If desired, several filters may be arranged in parallel and the mixture diverted to one while another is being cleaned of the accumulated solids. The filtered acid leaving at the bottom of the filter is, in whole or in part, returned through conduit 17 to the nitrator or reaction chamber.

The whole or a part of the acid may be sent, for instance, by a pump 16 through another conduit 18 to storage tank 19, whence it passes through concentrator 20 and conduit 21 back to the nitrator or reaction chamber. The concentrator is preferably a tower made of high silicon iron surrounded by a steam jacket 22 and filled with ordinary tower packing (not shown) through which the acid trickles. Sufficient steam is supplied to the jacket to keep the acid boiling vigorously. A concentrated acid containing the dissolved mercury is removed at the lower portion of the tower and passes back to the nitrator while the water and fume given out in the tower pass through exit conduit 23 to cooling condenser 24 which may be like the fumer cooler previously described (7). Condensed weak acid is removed at an exit 25 for subsequent concentration. Uncondensed fumes pass through a conduit 26 to the regenerating apparatus (9) previously described. Strong nitric acid is supplied to the nitrator from tank 27 through conduit 28.

In case spent nitric acid is withdrawn by the pump 16 from the cooling and separating cycle at too fast a rate, the excess in tank 19 may overflow by a conduit 29 directly to the nitrator as, for instance, through conduit 28.

The main supply of unused benzol may be kept in a large tank 30 from which it may be withdrawn as needed to a second and ordinarily small tank 31. This tank 31 has separate connections 32 and 33 with the cooling and separating circuit at opposite sides of the cooler. Preferably, these connections are as near the outlet from the nitrator and the inlet to the filter as possible. By the proper manipulation of the controlling valves, the location and operation of which will be apparent, benzol may be pumped from the tank 30 through pipe 32, pump 11, coil 12, pipe 14 and pipe 33 back to the tank 30. Thus, the dinitrophenol which has crystallized out or collected in the cooler and tends to restrict the free flow of mixture therethrough, may be quickly and effectively removed, due to its solubility in benzol. The dissolved dinitrobenzol does not go to the main supply tank but only to the tank 31 from which benzol is supplied to the nitrator through pipe 34. Thus, the dinitrophenol dissolved out in the cleaning of the cooler eventually goes right back into the system. Two coolers arranged in parallel may be employed so that one may be in use while the other is being cleaned.

I have shown the flow induced in part by pumps and in part by gravity. It will be evident that such details are relatively unimportant.

In an advantageous embodiment of the present invention using the described apparatus, the nitrator is first charged with cold 50 per cent. nitric acid containing about 0.3 to 0.5 pounds of mercury per gallon. The water tank surrounding the cooler 12 is charged with hot water and circulation by means of pumps 11 and 16 begun until the nitrator and its contents are at a temperature of about 50° C. At this time the hot water in the cooler tank is replaced with cold water and benzol is added to the nitrating mixture in the proportion of about two gallons to each 100 gallons of acid. Nitration, oxidation, and development of heat begin immediately with evolution of fumes consisting of a mixture of benzol vapor and oxid of nitrogen. The benzol vapor is condensed in the fume cooler 6 and is returned through conduit 35 connected to conduit 34. As the nitration and oxidation go on, dinitrophenol is produced and goes into solution in the hot acid. As the hot acid in its continuous cyclic flow passes through cooler 12 the dinitrophenol crystallizes out and is transmitted through 14 to filter 15, where the separated dinitrophenol collects. The acid freed of the dinitrophenol returns through 17. As the action goes on, the acid in the nitrator of course becomes weaker, this being partly due to the disappearance of nitric acid in nitration and oxidation, and partly to the formation of water in the chemical reactions. A portion of the acid is therefore continuously or intermittently diverted through 18, 19, 20 and 21. In 20, the excess of water is boiled off and escapes through 23. It carries some acid and the condensate recovered at 25 is therefore a weak acid of, usually, about 20 per cent. acid. Fresh nitric acid is added continuously or from time to time from tank 27. The weak acid appearing in 25 is of course not lost but may be converted into strong acid in a concentrator (not shown) and then returned to the system.

The dinitrophenol accumulating in filter 15 is washed, which is best done with nitric acid of about 60 to 70 per cent. strength. This takes out any impurities, including any adhering solution containing mercury. The acid used for washing may go back to the system. After washing with cold nitric acid, the dinitrophenol may now be washed with water to remove the excess acid. The acid removed in the washing is of course recovered. The washed dinitrophenol is a material of good commercial purity and may be dried and marketed, or it may be converted into trinitrophenol or picric acid by further nitration.

Further nitration may be accomplished by adding the dinitrophenol slowly to a mixture of strong nitric and sulfuric acid, gradually heating the acid mixture as the nitration proceeds to a final temperature which may be as high as 120° C.; or a mixture of 2 parts concentrated sulfuric acid and 1 part of nitrate of soda may be thoroughly mixed and then 1 part of dinitrophenol gradually added. The temperature is allowed to rise to a final temperature of about 120° C. in the manner stated and a very high yield of picric acid may be obtained.

Having thus described my invention, what I claim as new and desire to secure by Letters Patent is:

1. In the nitration of benzol, the process which comprises reacting upon benzol with nitric acid in the presence of a mercury compound in a suitable reaction vessel while continuously withdrawing portions of the mixture, cooling the withdrawn portions to produce crystallization, filtering out the crystals and returning the filtered liquid to the reaction vessel.

2. In the nitration of benzol, the process which comprises reacting upon benzol with nitric acid in the presence of a catalytic agent, withdrawing portions of the mixture, cooling the withdrawn portions to a temperature producing a separation into solid and liquid constituents, removing the solid constituents and returning the liquid constituents to the mixture.

3. In the nitration of benzol, the process which comprises establishing and maintaining a cyclic flow of nitric acid and dissolved mercury compounds to and through a reaction vessel, a cooling device, and a filter in a closed circuit and supplying benzol to said flow.

4. In the nitration of benzol, the process which comprises establishing and maintaining a cyclic flow of nitric acid and benzol, and a catalytic agent through a reaction vessel, a cooling device, and a filter in closed circuit and withdrawing reaction products from the circuit at said filter.

5. In the nitration of benzol, the process which comprises nitrating benzol in a suitable reaction chamber by the action of nitric acid at a temperature of about 50° C., withdrawing and cooling the fumes from said chamber, and returning to the reaction chamber the benzol condensed in so cooling said fumes.

6. In the nitration of benzol, the process which comprises nitrating benzol in a suitable reaction chamber by the action of nitric acid, withdrawing and cooling the fumes from said chamber, returning to the reaction chamber the benzol condensed in so cooling said fumes and maintaining acid strength by withdrawing acid from said reaction chamber, concentrating it and returning it to said chamber.

7. The method of nitrating benzol, which consists in heating nitric acid and the catalytic agent to a temperature of about 50° C., introducing benzol to the mixture and thereafter cooling the mixture to prevent the temperature rising materially above 60° C.

8. In the nitration of benzol, the process which comprises reacting upon benzol with nitric acid in the presence of a catalytic agent, withdrawing portions of the mixture, cooling the withdrawn portions to a temperature producing a separation into solid and liquid constituents, removing the solid constituents, concentrating the liquid constituents, and returning them to the mixture.

9. In the nitration of benzol, the process which comprises reacting upon benzol with nitric acid in the presence of a catalytic agent, withdrawing portions of the mixture, concentrating said portions to increase the acid strength, and returning said concentrated liquid portions to the reaction chamber.

10. The process which consists in maintaining a circulation of nitric acid, benzol and reaction products through a reaction chamber, a cooler and a filter, and intermittently circulating benzol through said cooler to remove reaction products therefrom.

11. The process which consists in maintaining a circulation of nitric acid, benzol and reaction products through a reaction chamber, a cooler and a filter, intermittently circulating benzol through said cooler to remove reaction products therefrom, and thereafter delivering said benzol to said reaction chamber.

12. In the nitration of benzol, the process which consists in reacting upon benzol with nitric acid between 45 per cent. and 55 per cent. strength at a temperature of approximately 50° to 60° C. in the presence of a catalytic agent and maintaining the acid strength by withdrawing the diluted acid and adding fresh stronger acid.

Signed at New York, in the county of New York, and State of New York, this 17th day of November, A. D. 1917.

THEODORE J. BREWSTER.